(No Model.)  2 Sheets—Sheet 1.

M. B. MANWARING & G. N. VANDERHOEF.
FILTER.

No. 456,119. Patented July 14, 1891.

Witnesses

Inventor
Morris B. Manwaring
George N. Vanderhoef
By their Attorney
Edwin H. Brown (No Model.) 2 Sheets—Sheet 2.

M. B. MANWARING & G. N. VANDERHOEF.
FILTER.

No. 456,119. Patented July 14, 1891.

UNITED STATES PATENT OFFICE.

MORRIS B. MANWARING AND GEORGE N. VANDERHOEF, OF BAYONNE, NEW JERSEY, ASSIGNORS, BY MESNE ASSIGNMENTS, TO FREDERICK BELTZ, TRUSTEE, OF NEW YORK, N. Y.

FILTER.

SPECIFICATION forming part of Letters Patent No. 456,119, dated July 14, 1891.

Application filed June 21, 1890. Serial No. 356,219. (No model.)

*To all whom it may concern:*

Be it known that we, MORRIS B. MANWARING and GEORGE N. VANDERHOEF, both of Bayonne, in the county of Hudson and State of New Jersey, have invented a certain new and useful Improvement in Filters, of which the following is a specification.

The object of our improvement is to provide a simple and inexpensive filter which will be capable of efficient use in a variety of ways.

We will describe a filter embodying our improvement and will point out its principal uses, and afterward set forth its novel features in claims.

Figure 1:
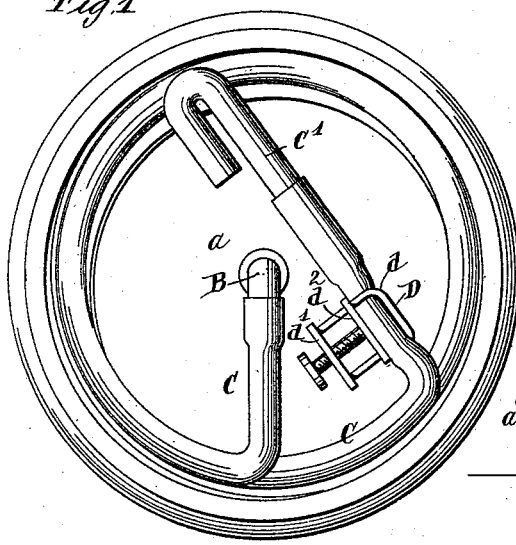
Figure 3:
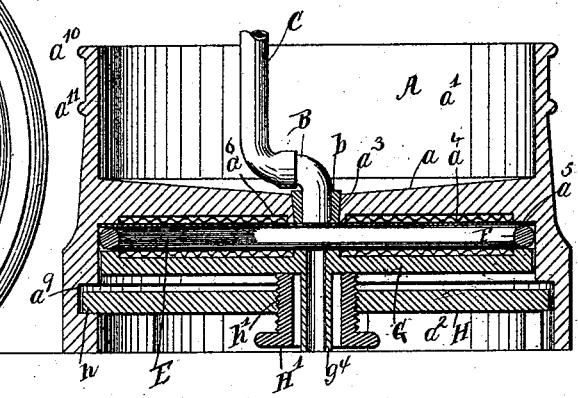
Figure 2:
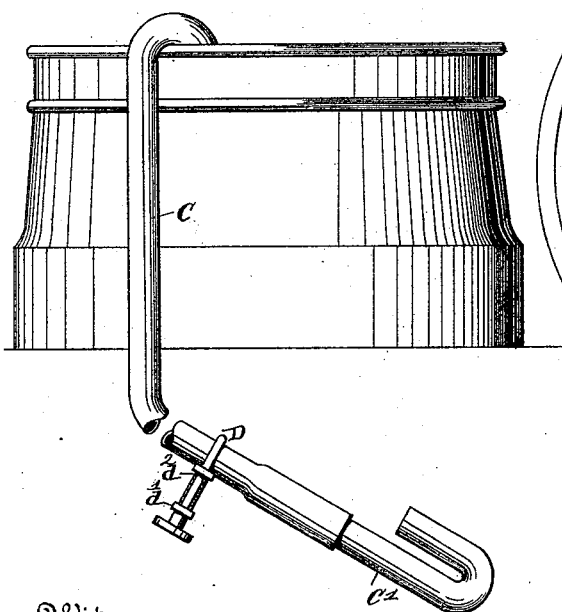
Figure 4:
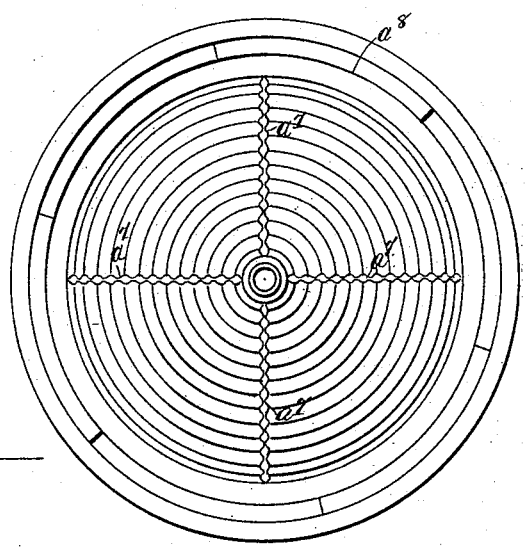
Figure 5:
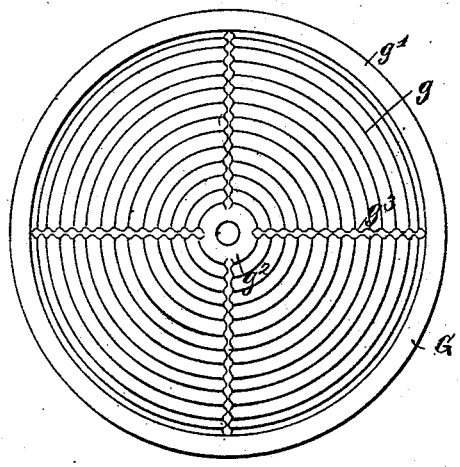
Figure 6:
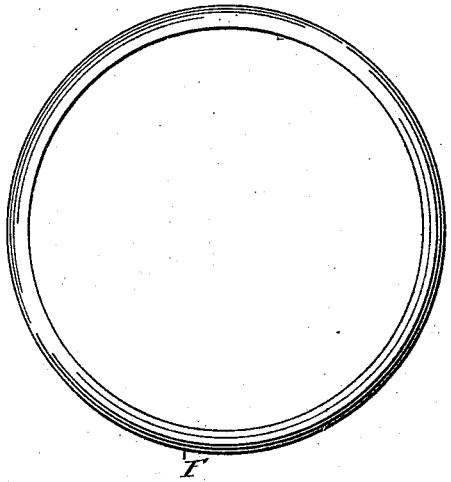
Figure 7:
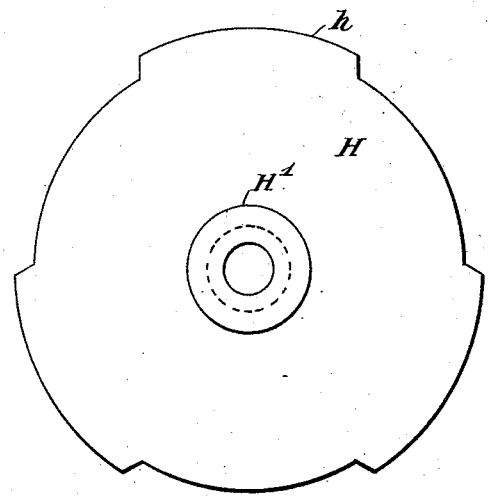
Figure 8:
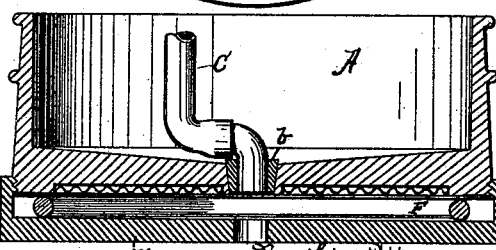

In the accompanying drawings, Figure 1 is a top view of a filter embodying our improvement. Fig. 2 is a side view of the same. Fig. 3 is a central vertical section of the filter. Fig. 4 is a bottom view of the body of the filter, certain parts having been removed therefrom. Fig. 5 is a top view of a plate which is fitted in the body of the filter. Fig. 6 is a view of a packing which is employed in this filter. Fig. 7 is a bottom view of a bottom plate which is used in the filter. Fig. 8 is a view similar to Fig. 3, but illustrating a modification.

Similar letters of reference designate corresponding parts in all the figures.

A designates the body of the filter. While it may be made of any suitable material, we prefer to make it of hard india-rubber or a material known as "fibrone." It may advantageously be made of hollow cylindric form. It will be seen that it is made more massive at the lower portion than at the upper. Around the extremity of the upper portion beads $a^{10}$ $a^{11}$ extend. Intermediate of its upper and lower edge a diaphragm $a$ extends across it, dividing it into upper and lower chambers $a'$ $a^2$. The upper surface of this diaphragm is preferably concave, as shown best in Fig. 3. At the center of the diaphragm is a hole $a^3$, into which is fitted a pipe B, packing $b$ being employed to secure a tight joint between this part and the diaphragm A. Preferably the pipe B will be made of glass. It is shown as bending laterally as it rises from the diaphragm. To its lateral extremity is secured a flexible pipe C, which may advantageously be made of soft rubber and can be united to the pipe B by simply slipping its end over the lateral extremity of the pipe B. The pipe C may be coiled up into small compass and placed wholly within the chamber $a'$ of the filter-body.

The free extremity of the pipe C—in other words, that end which is not attached to the pipe B—is provided with a bent end. Preferably this bent end will consist of a piece of glass pipe C', bent between its ends so as to form two parallel portions, and at one end slipped into the pipe C.

In one use of the filter the pipe C will hang downward. Obviously it will in this use have an upwardly-bent end by virtue of being provided with the pipe C'.

E designates a clamp which is fitted to the pipe C, so that at any time the latter may be pinched to throttle or close it. This clamp, as here shown, comprises a yoke $d$, constructed so as to be adapted to extend across the pipe C and having the ends of its arms fastened to a cross-plate $d'$. Fitted to the arms of this yoke is a plate $d^2$. This is intended to slide lengthwise of the arms and toward and from that portion of the yoke which is constructed to cross the pipe C. A screw $d^3$, engaging with a tapped hole in the plate $d'$ and impinging against the sliding plate $d^2$, serves to force the latter toward the cross portion of the yoke $d$, to effect the throttling or pinching of the pipe C, and so preclude the flow of liquid through this pipe.

In the chamber $a^2$, which is below the diaphragm $a$ in the filter-body, filter-paper E may be used. As here shown, the lower surface of the diaphragm $a$ has circular corrugations $a^4$ formed in it, excepting at the extreme edge portion, where it is left plain to form a rim $a^5$, and excepting at the center portion, where it is left plain to form a hub $a^6$. Radial grooves $a^7$ traverse the corrugations $a^4$.

The filter-paper E will at the edge bear against the rim-like portion $a^5$ on the under side of the diaphragm $a$ and be held there by packing F. This packing may be of any desired character—as, for instance, it may be an india-rubber ring of solid or tubular cross-section. Beneath the filter-paper a plate G is fitted into the chamber $a^2$ of the filter-body. This plate has circular corrugations $g$ formed in its upper surface, excepting only that at the outer edge, where it is left plain to form a rim-like portion $g'$, and that at the center it is left plain to form a hub-like portion $g^2$. Radial grooves $g^3$ intersect the corrugations $g$. It will be understood, therefore, that the upper surface of this plate G is substantially like the lower surface of the diaphragm $a$ of the filter-body. The rim-like portion $g'$ bears against the packing F, and serves to force the latter upward to clamp and hold the filter-paper tightly around the rim-like portion $a^5$ of the diaphragm $a$ in the filter-body.

An elastic packing such as we have described will obviously hold the edge of the filter-paper so tightly to the rim portion $a^5$ of the diaphragm $a$ as to prevent the passage of liquid between these parts.

H designates a locking-plate, which, as shown, is of circular form, but is provided on its periphery with a number of segmental lugs $h$. The side wall of the chamber $a^2$ of the filter-body is provided with a number of inwardly-extending segmental lugs $a^8$, and above these lugs with a circular shoulder $a^9$.

By inserting the locking-plate H in the bottom of the filter-body in such position that its lugs $h$ will be opposite the spaces between the lugs $a^8$ of the filter-body, said plate may be moved into a plane above the lugs $a^8$, and if, after being brought to this position, it is slightly rotated its lugs may be made to lap over and bear upon the upper side of the lugs $a^8$ of the filter-body. At the center of the locking-plate is a tapped hole $h'$. Into this is fitted a tubular screw H'. If after the insertion of the locking-plate in the manner thus described this screw is properly rotated its inner end may be made to bear against the plate G and press the latter upward, so as to effect the clamping of the filter-paper through the agency of the packing F. The screw will also, when thus manipulated, hold the locking-plate friction-tight within the filter-body, owing to the pressure with which it will cause the lugs $h$ of the locking-plate to bear against the lugs $a^8$ of the filter-body. It will be understood that by turning this screw so as to relax the pressure upon the parts and subsequently rotating the locking-plate to bring its lugs $h$ into a position opposite the spaces between the lugs $a^8$ of the filter-body the locking-plate may be removed from the filter-body, and subsequently the plate G, the packing F, and the filter-paper may be taken out.

It will be seen that the plate G is provided with a tubular extension $g^4$, which extends downwardly through the tubular screw H'. A pipe may be connected with this tubular extension $g^4$ in any suitable manner—as, for instance, if a pipe of soft rubber be used it may be simply slipped onto the same.

The plates G and H, as also the screw H', may be made of the same material as the filter-body, or of any other desired material.

Obviously the packing F may be inserted into the filter-body before the filter-paper, and the filter-paper may then be clamped tightly between the rim-like portion $g'$ of the plate G and the packing.

Owing to the presence of the beads $a^{10}$ $a^{11}$, a strainer-cloth may be extended over the top of the filter-body and fastened by a cord or rubber band or like contrivance.

Having now described the construction of the parts of the filter-body we will explain some of its principal uses.

The filter may be placed in liquid contained in any desired vessel and will float therein. When it is to be used in this way, the filter-paper will be placed above the packing, as represented in the drawings. The liquid in which the filter floats will rise through the tubular extension $g^4$ of the plate G, and thus reach the filter-paper. Therefore it will percolate through the filter-paper, circulate around the corrugations $a^7$ and grooves $a^8$, and as there is nothing to hold the filter-paper against the lower extremity of the pipe B the liquid will rise through the latter and pass off through the pipe C into any vessel which may be furnished for its reception, provided the pipe C is used as a siphon. If the pipe C is allowed to remain coiled in the upper chamber of the body of the filter, the liquid will rise into and over it. Afterward the free end of the tube may be lifted out of the upper chamber of the filter and lowered into a vessel provided for the reception of filtered liquid. This operation will start the pipe in operation as a siphon.

If desired, the filter may be placed upon any support, the pipe C introduced into a vessel containing liquid to be filtered, and a pipe fitted to the tubular extension $g^4$ of the plate G, extended into a receptacle which is provided for the filtered liquid. The liquid may then be caused to flow through the filter by a siphon action or otherwise, and will pass from the filter into the receptacle provided for it. When the filter is used in this manner, the filter-paper should be arranged beneath the packing F and upon the plate G.

If desirable, the pipes C and B may be removed from the filter, and liquid may be poured into the upper chamber of the filter as into a funnel; or a funnel may be fitted to the hole $a^3$ of the diaphragm in the filter-body. The liquid then can be supplied to pass through the filter-paper while arranged as last described, and thence into any suitable receptacle.

Instead of using the funnel in the manner described, a bottle may be turned upside down and supported in such position that its mouth will communicate with the opening $a^3$ of the filter-body.

The filter may, if the filter-paper be arranged above the packing and close to the diaphragm $a$ of the filter-body, be supported upon the top or mouth of a bottle or jar, and the pipe C extended to a bottle or jar on a lower level.

Many other uses will suggest themselves. Notably, if provision be made for counterbalancing air or other gaseous pressure, liquid may be made to flow from one inclosed vessel to another.

Our filter is so constructed that the filtering material is isolated from the surrounding air during operation. Therefore the filter may be used for filtering air to free it from microbes and dust particles by the use of proper media for chemical and surgical purposes. Even when out of use it may be protected from air by simply closing the pipe C and inserting a cork or block in the tubular extension $g^4$ of the plate G.

The filter-paper may be removed and a cloth stretched across the filter-body and fastened so as to adapt the same for use as a strainer.

We have shown a pipe I fitted to the tubular extension $g^4$ of the plate G. This pipe may advantageously be made of soft rubber or like material. Where it is desirable to take liquid in filtering it from the upper portion of a quantity contained in any vessel this pipe may have applied to its extremity a float J, which will serve to keep its extremity just below the top surface of the liquid. The upwardly-bent end with which the pipe C is furnished is desirable in siphoning, because it will prevent the entrance of air from stopping the action.

Our filter is, moreover, so constructed that the parts can be easily and quickly detached. This is important in placing the filter and in cleaning. It has no cavities or places wherein sediment can collect out of sight to taint and perhaps poison a succeeding liquid. All of its parts are of such construction that they can be readily cleansed.

One of our filters can be prepared for use as quickly as one sheet of filter-paper can be folded and placed in a funnel for filtering, and when prepared for use it will have an efficiency very greatly exceeding that of a funnel furnished with filter-paper.

In Fig. 8 we have shown that instead of using a plate G, such as we have already described, and a locking-plate H, we may use a plate G, having an internally screw-threaded flange which engages with a screw-thread on the exterior of the lower portion of the body A to secure such plate below the transverse diaphragm of the filter-body. This form of filter is cheaper than the one first described and for this reason desirable. It is not so desirable as the former, where wet filter-paper is used, because in the former no rotary motion is necessary in any part which will be liable to transmit movement to the filter-paper and therefore tend to tear it.

We have thus far referred to no filtering medium other than filter-paper; but we desire to substitute therefor any other filtering medium or material in sheet form.

What we claim as our invention, and desire to secure by Letters Patent, is—

1. The combination, with a filter-body constructed to float in liquid and having in its upper portion a chamber and also having a transverse diaphragm, forming the bottom of said chamber and constructed so that its under side constitutes a bearing-surface for filter material, of a plate fitted to the filter-body below said diaphragm and forming, in connection with said diaphragm, a filtering-chamber and a discharge-conduit extending from said filtering-chamber and carrying off liquid therefrom without delivering it into the first-mentioned chamber, which is located in the upper part of the filter-body, substantially as specified.

2. The combination, with a filter-body constructed to float in liquid, of a bearing-surface for filter material, a packing for resting against the filter material, a plate bearing against said packing, a locking-plate constructed to interlock with the filter-body, and a tubular screw engaging with the locking-plate and bearing against the first-mentioned plate, substantially as specified.

3. The combination, with a filter-body constructed to float in liquid, of a bearing-surface for filter material, a packing for resting against the filter material, a plate bearing against said packing, a locking-plate provided with segmental lugs engaging with similar lugs formed in the filter-body, and a tubular screw engaging with the locking-plate and impinging against the plate first mentioned, substantially as specified.

4. The combination, with a filter-body having a diaphragm provided with a central hole and corrugated or grooved on the under side inward of the outer portion and left plain at the outer portion to form a bearing for filter material, of a packing arranged opposite the said bearing for the filter material, and a plate arranged below said diaphragm of the filter-body and provided with corrugations or grooves opposite the corrugations or grooves in the diaphragm of the filter-body and having a bearing-surface opposite the packing, substantially as specified.

5. The combination, with a filter-body provided with a transverse diaphragm made concave toward the center on its upper side, having a central hole and corrugated or grooved on the underside inward of the outer portion and left plain at the outer portion to form a bearing for filter material, of a packing arranged opposite the said bearing for the filter material, and a plate arranged in the lower chamber of the filter and provided with corrugations or grooves opposite the corrugations or grooves in the diaphragm of the filter-body and having a bearing-surface opposite the packing, substantially as specified.

In testimony whereof we have signed our names to this specification in the presence of two subscribing witnesses.

MORRIS B. MANWARING.
GEORGE N. VANDERHOEF.

Witnesses:
S. O. EDMONDS,
WILLIAM M. ILIFF.